United States Patent
Lee et al.

(10) Patent No.: US 12,523,388 B2
(45) Date of Patent: Jan. 13, 2026

(54) AIR CONDITIONING SYSTEM, ELECTRONIC DEVICE, AND METHOD FOR CONTROLLING THE SAME

(71) Applicants: SAMSUNG ELECTRONICS CO., LTD., Suwon-si (KR); INDUSTRY FOUNDATION OF CHONNAM NATIONAL UNIVERSITY, Gwangju (KR)

(72) Inventors: Jehyeon Lee, Suwon-si (KR); Woohyun Kim, Seocho-gu (KR); Kwanwoo Song, Suwon-si (KR)

(*) Notice: Subject to any disclaimer, the term of this patent is extended or adjusted under 35 U.S.C. 154(b) by 220 days.

(21) Appl. No.: 18/089,244

(22) Filed: Dec. 27, 2022

(65) Prior Publication Data

US 2023/0272936 A1   Aug. 31, 2023

Related U.S. Application Data

(63) Continuation of application No. PCT/KR2022/020412, filed on Dec. 15, 2022.

(30) Foreign Application Priority Data

Feb. 28, 2022   (KR) .................. 10-2022-0026329

(51) Int. Cl.
*F24F 11/65*   (2018.01)
*F24F 11/32*   (2018.01)
(Continued)

(52) U.S. Cl.
CPC .............. *F24F 11/65* (2018.01); *F24F 11/32* (2018.01); *F24F 11/52* (2018.01); *F28G 15/003* (2013.01)

(58) Field of Classification Search
CPC .. F24F 11/65; F24F 11/32; F24F 11/52; F24F 2140/12; F24F 2140/20; F24F 11/46;
(Continued)

(56) References Cited

U.S. PATENT DOCUMENTS 5,860,285 A    1/1999  Tulpule
10,415,842 B2  9/2019  Nagahashi et al.
(Continued)

FOREIGN PATENT DOCUMENTS

CN    111912080 A    11/2020
CN    112052564 A    12/2020
(Continued)

OTHER PUBLICATIONS

WO 2018/142711 (Year: 2018).*
(Continued)

*Primary Examiner* — Alexander Markoff
(74) *Attorney, Agent, or Firm* — STAAS & HALSEY LLP

(57) ABSTRACT

Provided is an electronic device includes a user interface; a communication module configured to perform communication with at least one outdoor unit and a plurality of indoor units connected to the at least one outdoor unit; and a processor configured to determine a heat exchanger with a contamination level equal to or higher than a preset contamination level among a heat exchanger of the at least one outdoor unit and heat exchangers of the plurality of indoor units based on an output from a neural network for operation data received from each of the at least one outdoor unit and the plurality of indoor units, determine a cleaning period of the determined heat exchanger based on a rate of increase in energy of the determined heat exchanger, and control the user interface to output information indicating the determined cleaning period, wherein the neural network is trained with operation data varying by contamination level of a heat exchanger.

9 Claims, 10 Drawing Sheets

(51) Int. Cl.
  *F24F 11/52*    (2018.01)
  *F28G 15/00*    (2006.01)
(58) Field of Classification Search
  CPC ........ F24F 11/49; F24F 2140/60; F24F 11/64;
            F24F 2140/50; F24F 2221/22; F28G
                                15/003; G06N 3/02
  See application file for complete search history.

(56)      References Cited

U.S. PATENT DOCUMENTS

| | | | | |
|---|---|---|---|---|
| 12,242,259 | B2* | 3/2025 | Elbsat | ............... G16Y 20/30 |
| 2005/0269254 | A1* | 12/2005 | Roitman | ............... B01D 53/86 |
| | | | | 210/252 |
| 2005/0279845 | A1* | 12/2005 | Bagwell | ............... B08B 15/00 |
| | | | | 62/157 |
| 2015/0330650 | A1* | 11/2015 | Abiprojo | ............... F24F 11/30 |
| | | | | 700/276 |
| 2016/0273856 | A1 | 9/2016 | Seippel | |
| 2017/0292725 | A1* | 10/2017 | Conley | ............... F24F 11/39 |
| 2018/0130031 | A1* | 5/2018 | Arensmeier | ............ F24F 11/38 |
| 2018/0283723 | A1* | 10/2018 | Ock | ............... G05B 15/02 |
| 2019/0264940 | A1* | 8/2019 | Lee | ............... F24F 11/58 |
| 2020/0356087 | A1* | 11/2020 | Elbsat | ............... G05B 23/0254 |
| 2021/0041347 | A1 | 2/2021 | Shehri et al. | |
| 2021/0140695 | A1 | 5/2021 | Terzic et al. | |

FOREIGN PATENT DOCUMENTS

| | | | |
|---|---|---|---|
| CN | 113405217 | A | 9/2021 |
| JP | 4775338 | | 9/2011 |
| JP | 2021-8989 | | 1/2021 |
| JP | 2021-177308 | | 11/2021 |
| KR | 1999-006754 | | 1/1999 |
| KR | 10-2004-0033357 | | 4/2004 |
| KR | 10-2004-0044684 | | 5/2004 |
| KR | 20-2015-0000691 | | 2/2015 |
| KR | 10-1592998 | | 2/2016 |
| KR | 10-1995311 | | 9/2019 |
| KR | 10-2021-0011976 | | 2/2021 |
| KR | 10-2296329 | | 9/2021 |
| WO | WO 2018/142711 | A1 | 8/2018 |

OTHER PUBLICATIONS

CN 109442680 (Year: 2019).*
CN 109882935 (Year: 2019).*
CN 111486555 (Year: 2020).*
CN 112503725 (Year: 2021).*
CN 113068374 (Year: 2021).*
KR 10-2021-0091028 (Year: 2021).*
Supplementary European Search Report dated Dec. 12, 2024 issued In European Application No. EP 22 92 9092.
International Search Report, PCT/ISA/210, dated Mar. 24, 2023, in PCT Application No. PCT/KR2022/020412.
Written Opinion, PCT/ISA/237, dated Mar. 24, 2023, in PCT Application No. PCT/KR2022/020412.
Office Action dated Jun. 2, 2025, in European Application No. 22 929 092.9.

* cited by examiner

FIG. 8

| ITEM | CLEANING PERIOD | D-Day | WHETHER TO CLEAN |
|---|---|---|---|
| OUTDOOR UNIT | 100 DAYS | -30 DAYS | CLEANING |
| FIRST INDOOR UNIT | 350 DAYS | -300 DAYS | - |
| SECOND INDOOR UNIT | 230 DAYS | -100 DAYS | - |

FIG. 9

| ITEM | INDOOR UNIT | CLEANING PERIOD | D-Day | WHETHER TO CLEAN |
|---|---|---|---|---|
| FIRST OUTDOOR UNIT | CAFÉ, RESTAURANT··· | 100 DAYS | -30 DAYS | CLEANING |
| SECOND OUTDOOR UNIT | CONFERENCE ROOM, OFFICE ROOM··· | 350 DAYS | -300 DAYS | - |
| THIRD OUTDOOR UNIT | LOBBY, CORRIDOR··· | 230 DAYS | -100 DAYS | - |

AIR CONDITIONING SYSTEM, ELECTRONIC DEVICE, AND METHOD FOR CONTROLLING THE SAME

CROSS-REFERENCE TO RELATED APPLICATION

This application is a continuation of International Application PCT/KR2022/020412, filed Dec. 15, 2022, and is based on and claims priority under 35 U.S.C. § 119 to Korean Patent Application No. 10-2022-0026329, filed Feb. 28, 2022, the disclosures of which are incorporated herein by reference in their entireties.

BACKGROUND

1. Field

The disclosure relates to an air conditioning system for controlling indoor air and an electronic device for controlling the air conditioning system.

2. Discussion of Related Art

Air conditioning equipment for buildings gradually expands from the existing representative central conditioning systems to individual air conditioning systems which are system air conditioners these days. The air conditioning equipment is applied to various fields such as retail stores, multipurpose buildings, schools, small/medium sized buildings.

The system air conditioner may be commonly comprised of an outdoor unit including a compressor, an outdoor heat exchanger and other devices, and an indoor unit including an expansion device and an indoor heat exchanger. Furthermore, the system air conditioner employs a heat pump method that uses a four-way valve to enable switching between cooling and heating.

The system conditioner, to which such a two-stage compression cycle that enables cooling and heating is applied, is an air conditioning system capable of cooling or heating the room using transfer of heat produced in the process of compressing, condensing, expanding and evaporating a refrigerant.

However, the heat exchangers of the outdoor unit and the indoor unit of the system air conditioner may suffer from degradation of performance due to contamination as soon as the system air conditioner is used, causing deterioration of energy efficiency and leading to an increase in electricity rate. Accordingly, regular cleaning of the heat exchangers is required, but there is a difficulty in selecting a time for cleaning and a target device.

SUMMARY

According to an embodiment of the disclosure, an electronic device includes a user interface; a communication module configured to perform communication with at least one outdoor unit and a plurality of indoor units connected to the at least one outdoor unit; and a processor configured to determine a heat exchanger with a contamination level equal to or higher than a preset contamination level among a heat exchanger of the at least one outdoor unit and heat exchangers of the plurality of indoor units based on an output from a neural network for operation data received from each of the at least one outdoor unit and the plurality of indoor units, determine a cleaning period of the determined heat exchanger based on a rate of increase in energy of the determined heat exchanger, and control the user interface to output information indicating the determined cleaning period.

The neural network may be trained with operation data varying by contamination level of a heat exchanger, and each of the operation data received from each of the at least one outdoor unit and the plurality of indoor units and the operation data varying by contamination level of the heat exchanger may include at least one of pressure of a heat exchanger, temperature of a heat exchanger, a frequency of a compressor of the outdoor unit, and a number of revolutions of a blower fan of the at least one outdoor unit.

The at least one processor may determine the rate of increase in energy to be a ratio between power measured through a watt-hour meter and reference power calculated based on compressor map data.

The compressor map data may be experimental result data on power consumption of a compressor depending on a change in saturated evaporation temperature of a heat exchanger, saturated condensation temperature of a heat exchanger and compressor frequency in a design environment.

The at least one processor may determine the reference power depending on the saturated evaporation temperature of the heat exchanger, the saturated condensation temperature of the heat exchanger and the compressor frequency based on the compressor map data.

The at least one processor may determine a rate of increase in energy depending on an accumulated number of operation days through regression analysis on the rate of increase in energy.

The at least one processor may determine an increased electricity rate depending on the accumulated number of operation days based on the rate of increase in energy depending on the accumulated number of operation days and an electricity rate per day.

The at least one processor may determine the cleaning period by comparing the increased electricity rate depending on the accumulated number of operation days with a preset cleaning service rate.

The at least one processor may determine a difference between a date at which the increased electricity rate depending on the accumulated number of operation days exceeds the preset cleaning service rate and a previous cleaning date as the cleaning period.

The electronic device may include the neural network, wherein the neural network may be trained with operation data varying by contamination level of a heat exchanger.

According to an embodiment of the disclosure, a method of controlling an electronic device including a user interface and that communicates with at least one outdoor unit and a plurality of indoor units connected to the at least one outdoor unit includes determining a heat exchanger with a contamination level equal to or higher than a preset contamination level among a heat exchanger of the at least one outdoor unit and heat exchangers of the plurality of indoor units based on an output from a neural network for operation data received from each of the at least one outdoor unit and the plurality of indoor units; determining a cleaning period of the determined heat exchanger based on a rate of increase in energy of the determined heat exchanger; and controlling the user interface to output information indicating the determined cleaning period.

The neural network may be trained with operation data varying by contamination level of a heat exchanger, and each of the operation data received from each of the at least one outdoor unit and the plurality of indoor units and the operation data varying by contamination level of the heat exchanger may include at least one of pressure of a heat exchanger, temperature of a heat exchanger, a frequency of a compressor of the outdoor unit, and a number of revolutions of a blower fan of the at least one outdoor unit.

The determining of the cleaning period may include determining the rate of increase in energy to be a ratio between power measured through a watt-hour meter and reference power calculated based on compressor map data.

The compressor map data may be experimental result data on power consumption of a compressor depending on a change in saturated evaporation temperature of a heat exchanger, saturated condensation temperature of a heat exchanger and compressor frequency in a design environment.

The determining of the cleaning period may include determining the reference power depending on saturated evaporation temperature of a heat exchanger, saturated condensation temperature of a heat exchanger and a compressor frequency based on the compressor map data.

The determining of the cleaning period may include determining a rate of increase in energy depending on an accumulated number of operation days through regression analysis on the rate of increase in energy.

The method may further include training the neural network with operation data varying by contamination level of a heat exchanger.

The determining of the cleaning period may include determining an increased electricity rate depending on the accumulated number of operation days based on a rate of increase in energy depending on the accumulated number of operation days and an electricity rate per day.

The determining of the cleaning period may include determining the cleaning period by comparing the increased electricity rate depending on the accumulated number of operation days with a preset cleaning service rate.

The determining of the cleaning period may include determining a difference between a date at which the increased electricity rate depending on the accumulated number of operation days exceeds the preset cleaning service rate and a previous cleaning date as the cleaning period.

According to an embodiment of the disclosure, an air conditioning system includes at least one outdoor unit; a plurality of indoor units connected to the at least one outdoor unit; and an electronic device configured to determine a heat exchanger with a contamination level equal to or higher than a preset contamination level among a heat exchanger of the at least one outdoor unit and heat exchangers of the plurality of indoor units based on an output from a neural network for operation data received from each of the at least one outdoor unit and the plurality of indoor units, determine a cleaning period of the determined heat exchanger based on a rate of increase in energy of the determined heat exchanger, and output the determined cleaning period, wherein the neural network is trained with operation data varying by contamination level of a heat exchanger.

Each of the operation data received from each of the at least one outdoor unit and the plurality of indoor units and the operation data varying by contamination level of the heat exchanger may include at least one of pressure of a heat exchanger, temperature of a heat exchanger, a frequency of a compressor of the outdoor unit, and a number of revolutions of a blower fan of the at least one outdoor unit.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which:

FIG. 8 illustrates an example in which an electronic device displays information indicating cleaning periods of heat exchangers, according to an embodiment of the disclosure;

FIG. 9 illustrates an example in which an electronic device displays information indicating cleaning periods of heat exchangers, according to an embodiment of the disclosure.

DETAILED DESCRIPTION OF EXEMPLARY EMBODIMENTS

Figure 1:
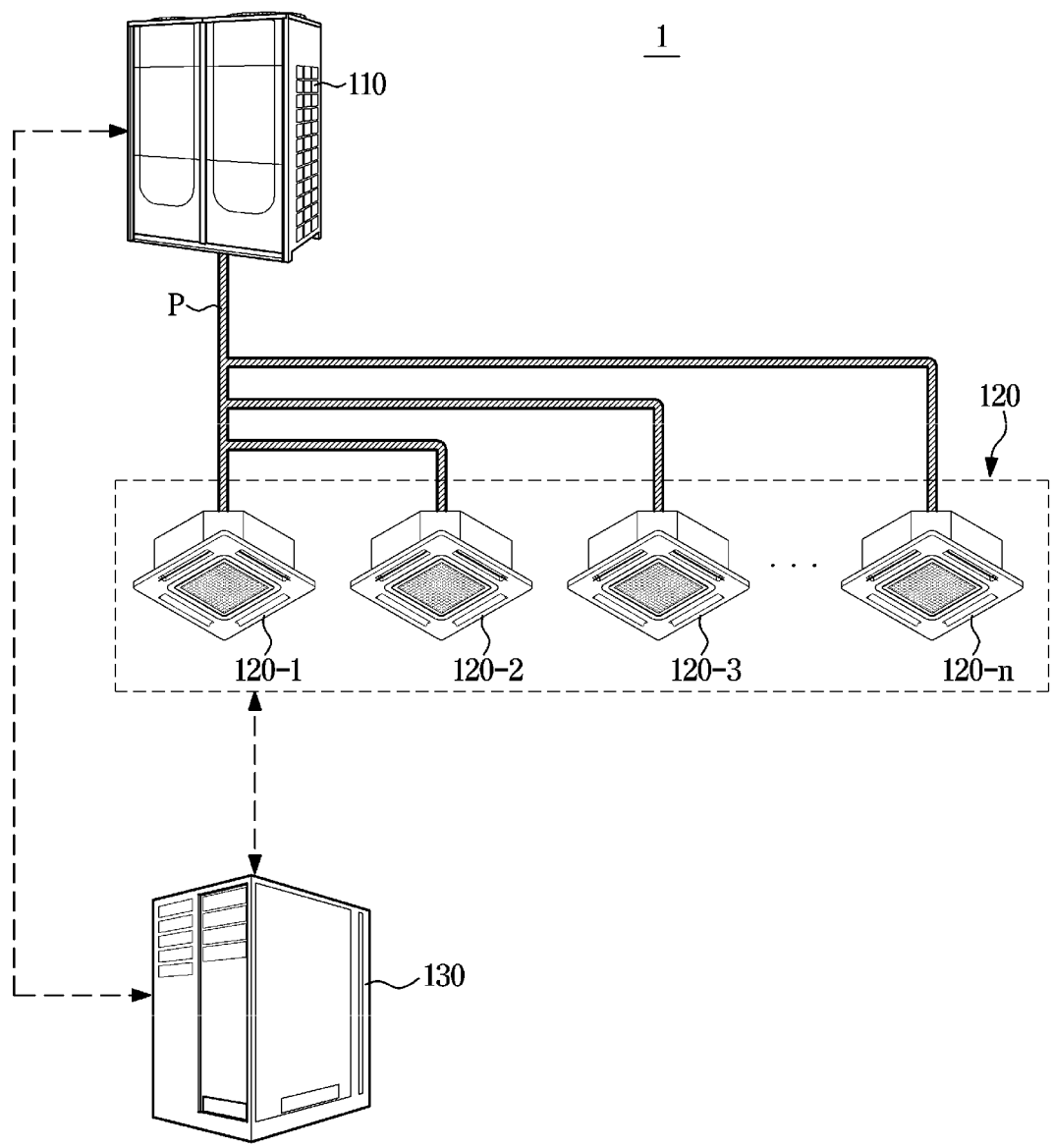
FIG. 1 illustrates air conditioning system, according to an embodiment of the disclosure.

Embodiments and features as described and illustrated in the disclosure are merely examples, and there may be various modifications replacing the embodiments and drawings at the time of filing this application.

It will be further understood that the term "connect" or its derivatives refer both to direct and indirect connection, and the indirect connection includes a connection over a wireless communication network.

The terminology used herein is for the purpose of describing particular embodiments only and is not intended to limit the disclosure. It is to be understood that the singular forms "a," "an," and "the" include plural references unless the context clearly dictates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The terms including ordinal numbers like "first" and "second" may be used to explain various components, but the components are not limited by the terms. The terms are only for the purpose of distinguishing a component from another. Thus, a first element, component, region, layer or room discussed below could be termed a second element, component, region, layer or section without departing from the teachings of the disclosure.

Furthermore, the terms, such as "~part", "~block", "~member", "~module", etc., may refer to a unit of handling at least one function or operation. For example, the terms may refer to at least one process handled by hardware such as field-programmable gate array (FPGA)/application specific integrated circuit (ASIC), etc., software stored in a memory, or at least one processor.

Terminology such as "at least one of A and B", as used herein, includes any of the following: A, B, A and B. Similarly, terminology such as "at least one of A, B, and C", as used herein, includes any of the following: A, B, C, A and B, A and C, B and C, A and B and C. Reference numerals used for method steps are just used to identify the respective steps, but not to limit an order of the steps. Thus, unless the context clearly dictates otherwise, the written order may also be practiced otherwise.

The disclosure provides an electronic device in an air conditioning system, which is able to identify a target device (or unit) having performance degradation due to contamination of a heat exchanger in the air conditioning system, and determine and notify a cleaning period of the heat exchanger of the target device to the user.

Reference will now be made in detail to embodiments of the disclosure, which are illustrated in the accompanying drawings.

FIG. 1 illustrates air conditioning system, according to an embodiment of the disclosure.

Referring to FIG. 1, an air conditioning system 1 may include at least one outdoor unit 110, a plurality of indoor units 120 connected to the at least one outdoor unit 110, and an electronic device 130 that may control the outdoor unit 110 and the plurality of indoor units 120.

For example, as shown in FIG. 1, the air conditioning system 1 may include the one outdoor unit 110 and the plurality of indoor units 120-1, 120-2, 120-3, . . . , 120-n: 120 connected to the one outdoor unit 110. However, unlike what is shown in FIG. 1, the air conditioning system 1 may include a plurality of outdoor units, each of which may be connected to the plurality of indoor units 120. Although the single outdoor unit 110 will now be taken as an example, it is not limited thereto and the disclosure will be equally applied to an embodiment in which the outdoor unit 110 is provided in the plural.

Furthermore, the air conditioning system 1 may include a refrigerant path P in which a refrigerant is circulated between the outdoor unit 110 and the indoor unit 120, i.e., the refrigerant may be circulated between the outdoor unit 110 and the indoor unit 120 along the refrigerant path P.

In an embodiment of the disclosure, the outdoor unit 110 may include a compressor for compressing the refrigerant, an outdoor heat exchanger for performing heat exchange between outside air and the refrigerant, an outdoor blower fan arranged around the outdoor heat exchanger for blowing the outside air to the outdoor heat exchanger so that the refrigerant and the outside air may exchange heat in the outdoor heat exchanger, a four-way valve for leading the refrigerant compressed by the compressor selectively to one of the outdoor heat exchanger and the indoor unit depending on cooling operation or heating operation, an expansion valve for decompressing the refrigerant, and an accumulator for preventing a refrigerant liquid that has not yet been evaporated from flowing into the compressor.

In an embodiment of the disclosure, the indoor unit 120 may include an indoor heat exchanger for performing heat exchange between inside air and the refrigerant, and an indoor blower fan for blowing the inside air to the indoor heat exchanger.

The refrigerant may emit heat in the outdoor heat exchanger and absorb heat in the indoor heat exchanger during the cooling operation. Specifically, the refrigerant compressed by the compressor may be supplied first to the outdoor heat exchanger through the four-way valve and then supplied to the indoor heat exchanger during the cooling operation. In this case, the outdoor heat exchanger may function as a condenser that condenses the refrigerant, and the indoor heat exchanger may function as an evaporator that evaporates the refrigerant.

The refrigerant may emit heat in the indoor heat exchanger and absorb heat in the outdoor heat exchanger during the heating operation. Specifically, the refrigerant compressed by the compressor may be supplied first to the indoor heat exchanger through the four-way valve and then supplied to the outdoor heat exchanger during the heating operation. In this case, the indoor heat exchanger may function as a condenser that condenses the refrigerant, and the outdoor heat exchanger may function as an evaporator that evaporates the refrigerant.

In an embodiment of the disclosure, the electronic device 130 may control the at least one outdoor unit 110 and the plurality of indoor units 120 connected to the at least one outdoor unit 110. Specifically, the electronic device 130 may receive operation data from each unit, transmit a control command to the unit, or determine a cleaning period of a heat exchanger of the unit.

For example, the electronic device 130 may correspond to a control device that is able to control components of the air conditioning system 1, such as a building automation system (BAS) or a building energy management system (BEMS).

Specifically, the electronic device 130 may determine a heat exchanger with a contamination level equal to or higher than a preset contamination level based on an output from a neural network for the operation data received from each of the outdoor unit 110 and the indoor unit 120. For example, the electronic device 130 may use a neural network trained with operation data that varies by contamination level to determine a unit (at least one of the outdoor unit 110 and the plurality of indoor units 120) having a heat exchanger with a high contamination level.

Furthermore, the electronic device 130 may determine a cleaning period of the heat exchanger based on a rate of increase in energy in the heat exchanger with the high contamination level, and notify the cleaning period to the user.

In other words, the electronic device 130 may determine a target unit having a heat exchanger with a high contamination level based on the operation data received from each of the at least one outdoor unit 110 and the plurality of indoor units 120 connected to the at least one outdoor unit 110 and determine and notify a cleaning period based on a rate of increase in energy in the heat exchanger of the target unit, thereby resolving difficulties in identifying a target to be cleaned and determining a cleaning period due to the nature of the system air conditioner with a lot of constituent units.

Determining a heat exchanger with a high contamination level and determining a cleaning period of the heat exchanger will be described later in detail.

Although not shown, the air conditioning system 1 may also include a distributor (not shown) arranged in the refrigerant path P between the outdoor unit 110 and the indoor unit 120 for distributing the refrigerant supplied from the outdoor unit 110 to each indoor unit 120 according to an operation mode of the indoor unit 120 in an embodiment of the disclosure.

The components included in the air conditioning system 1 have thus far been described. How the electronic device 130 determines a unit having a heat exchanger with a high contamination level and notifies a cleaning period of the heat exchanger will now be described in detail.

Figure 2:
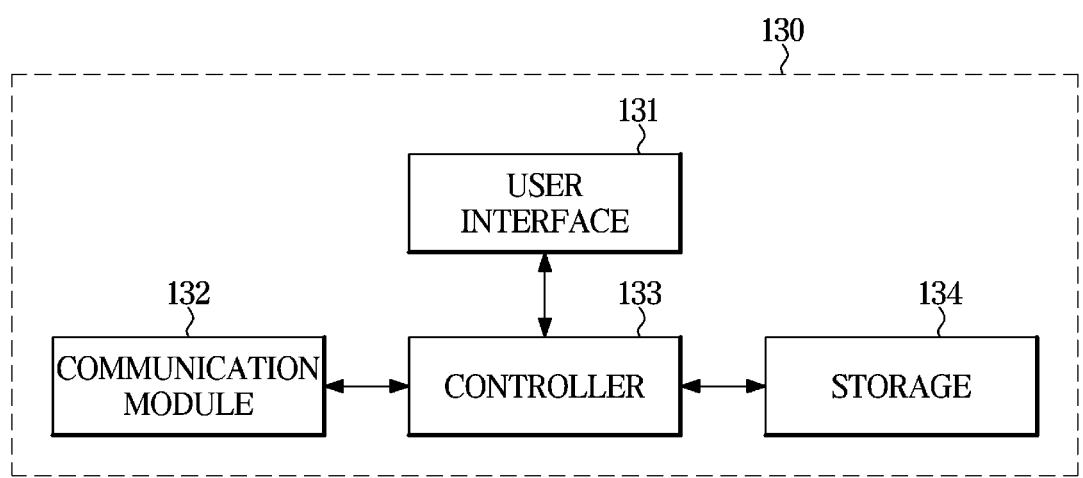
FIG. 2 is a control block diagram of an electronic device, according to an embodiment of the disclosure.

FIG. 2 is a control block diagram of the electronic device 130, according to an embodiment of the disclosure.

Referring to FIG. 2, the electronic device 130 includes a user interface 131 for receiving an input from the user or outputting various information, a communication module 132 for communicating with the outdoor unit 110 and the indoor unit 120 included in the air conditioning system 1, a controller 133 for identifying a heat exchanger with a high contamination level and notifying the cleaning period, and a storage 134 for storing various information required for control.

At least one component may be added to or omitted from the electronic device 160 to correspond to the performance of the electronic device 130 as shown in FIG. 2. Furthermore, it will be obvious to those of ordinary skill in the art that the relative positions of the components may be changed to correspond to the system performance or structure.

In an embodiment of the disclosure, the user interface 131 may receive an input from the user or output various information. For this, the user interface 131 may include a known-type of input device and a known-type of display panel, or in an embodiment of the disclosure, may include a touch panel in which an input device and a display panel are integrally formed.

In an embodiment of the disclosure, the communication module 132 may transmit or receive data to or from the outdoor unit 110 and the indoor unit 120 included in the air conditioning system 1. Specifically, the communication module 132 may perform wired or wireless communication with the outdoor unit 110 and the indoor unit 120. For this, the communication module 132 may be provided as a known-type of communication module.

In an embodiment of the disclosure, the controller 133 may determine a heat exchanger with a contamination level equal to or higher than a preset contamination level among the outdoor heat exchanger of the outdoor unit 110 and the indoor heat exchanger of the indoor unit 120 based on an output of the neural network for operation data received from each of the outdoor unit 110 and the indoor unit 120 included in the air conditioning system 1. In the following description, a heat exchanger may correspond to at least one of the outdoor heat exchanger of the outdoor unit 110 or the indoor heat exchanger of the indoor unit 120.

The preset contamination level may be set according to an input of the user. Contamination of a heat exchanger may mean that contaminants such as dust accumulate on the heat exchanger and a filter of the heat exchanger with use, leading to a reduction in efficiency of heat exchange and air flow rate.

The operation data may include at least one of pressure of a heat exchanger, temperature of a heat exchanger, a frequency of a compressor, and a number of revolutions of the outdoor blower fan. As an additional example, the operation data may include at least one of pressure and refrigerant condensation temperature in a heat exchanger that functions as a condenser, pressure and refrigerant evaporation temperature in a heat exchanger that functions as an evaporator, a frequency of a compressor, and a number of revolutions of the outdoor blower fan.

For this, the outdoor unit 110 may include a pressure sensor and a temperature sensor arranged on one side of the outdoor heat exchanger, a revolution count sensor for detecting the number of revolutions of a motor of the compressor, and a revolution count sensor for detecting the number of revolutions of the outdoor blower fan. The outdoor unit 110 may further include at least one processor and a communication module, and the at least one processor may determine operation data based on an output value from a sensor and control the communication module to transmit the operation data to the electronic device 130. In this case, the processor of the outdoor unit 110 may determine a frequency of the compressor based on the number of revolutions of the compressor motor.

Furthermore, the indoor unit 120 may include a pressure sensor and a temperature sensor arranged on one side of the indoor heat exchanger, and include at least one processor and a communication module. The processor of the indoor unit 120 may determine operation data based on an output value from a sensor and control the communication module to transmit the operation data to the electronic device 130.

The neural network may be trained with the operation data that varies by contamination level of a heat exchanger. The operation data used to train the neural network may also include at least one of pressure of a heat exchanger, temperature of a heat exchanger, a frequency of the compressor, and a number of revolutions of the outdoor blower fan.

Specifically, the controller 133 may train the neural network with operation data for each contamination level in a heat exchanger contamination reconstruction experiment as training data. In the heat exchanger contamination reconstruction experiment, a device for suppressing flows of air around the heat exchanger, e.g., a windbreaker, may be installed to reconstruct contamination of the heat exchanger, in which case the measured operation data and a reconstructed contamination level may be used as the training data for the neural network.

The neural network refers to machine learning that embodies a neural structure capable of performing deep learning, and as weight and bias corresponding to elements of the neural network keep changing, learning confidence is improved. In other words, the neural network may keep updating weights, biases, and activation functions included in the neural network based on the operation data that varies by the reconstructed contamination level, thereby enhancing inference results of the neural network.

The neural network may include a convolution neural network (CNN) that generates a features map output by convolution of the operation data and inputs the features map to the neural network but it is not limited thereto and may be implemented with another deep learning algorithm including a recurrent neural network (RNN). That is, there is no limitations on the type of the neural network.

In an embodiment of the disclosure, the controller 133 may determine a cleaning period of the heat exchanger determined to have a contamination level equal to or higher than the preset contamination level based on a rate of increase in energy of the heat exchanger, and control the user interface 131 to output the cleaning period.

Specifically, the controller 133 may determine a rate of increase in energy of the heat exchanger determined to have a contamination level equal to or higher than the preset contamination level to be a ratio between power measured by a watt-hour meter and reference power calculated based on the compressor map data.

The watt-hour meter may be provided for each of the outdoor unit 110 and the indoor unit 120 for detecting power consumed by the corresponding unit. For this, the watt-hour meter may be provided as a known-type of watt-hour meter.

The compressor map data may be experimental result data on power consumption of the compressor depending on a change in saturated evaporation temperature of a heat exchanger, saturated condensation temperature of the heat exchanger and frequency of the compressor in a design environment.

In an embodiment of the disclosure, the controller 133 may determine the reference power depending on evaporation temperature of a heat exchanger, condensation temperature of the heat exchanger and a frequency of the compressor based on the compressor map data, Specifically, the controller 133 may determine the reference power depending on a refrigerant saturated evaporation temperature in a heat exchanger that functions as an evaporator, a refrigerant saturated condensation temperature in a heat exchanger that functions as a condenser, and a compressor frequency through regression analysis using the compressor map data in a design stage. Specifically, the controller 133 may build up a virtual sensor that expects consumption power, i.e., reference power, based on a saturated evaporation temperature and a saturated condensation temperature of a heat exchanger and a compressor frequency by using the compressor map data determined in a design environment, and calculate reference power by inputting the saturated evaporation temperature and the saturated condensation temperature of the heat exchanger and compressor frequency data of the air conditioning system 1 being used in an actual building to the virtual sensor.

In an embodiment of the disclosure, the controller 133 may determine a rate of increase in energy depending on the accumulated number of operation days through regression analysis on the rate of increase in energy determined to be the ratio between the power measured by the watt-hour meter and the reference power calculated based on the compressor map data.

In other words, the controller 133 may determine a rate of increase in energy having a particular value during a preset period, and determine a rate of increase in energy over time through regression analysis on rates of increase in energy determined in the preset period.

In an embodiment of the disclosure, the controller 133 may determine an increased electricity rate depending on the accumulated number of operation days based on a rate of increase in energy depending on the accumulated number of operation days and an electricity rate per day.

In other words, the controller 133 may determine an increased electricity rate per day by multiplying the rate of increase in energy per day and the electricity rate per day, and determine an increased electricity rate depending on the accumulated number of operation days by adding the increased electricity rate per day.

In an embodiment of the disclosure, the controller 133 may determine a cleaning period by comparing the increased electricity rate depending on the accumulated number of operation days with a preset cleaning service rate.

Specifically, the controller 133 may determine a difference between a date at which the increased electricity rate depending on the accumulated number of operation days exceeds the preset cleaning service rate and a previous cleaning date as the cleaning period.

As described above, the controller 133 may control the user interface 131 to output the determined cleaning period, and in an embodiment of the disclosure, may control the communication module 132 to transmit the cleaning period to a user interface of a user terminal or the indoor unit 120.

The controller 133 may include at least one memory for storing a program for carrying out the aforementioned and following operations, and at least one processor for executing the program.

The storage 134 may store various information required for control. For example, the storage 134 may store e.g., the neural network trained with the operation data that varies by contamination level of a heat exchanger. For this, the storage 134 may be provided as a known-type of storage medium.

Figure 3:
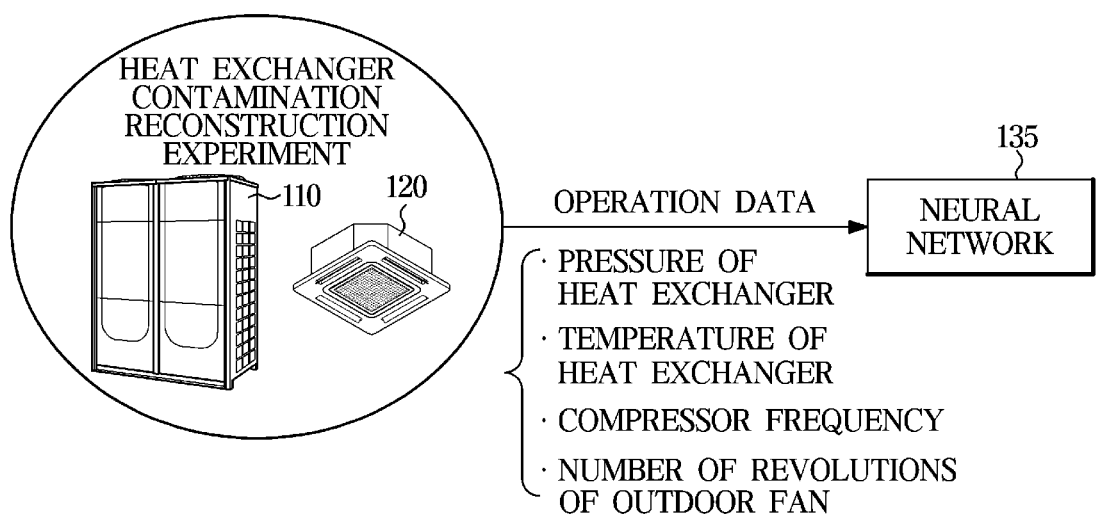
FIG. 3 is a diagram for describing an occasion when an electronic device trains a neural network, according to an embodiment of the disclosure.

FIG. 3 is a diagram for describing an occasion when the electronic device 130 trains a neural network, according to an embodiment of the disclosure.

Referring to FIG. 3, the electronic device 130 may train a neural network 135 with operation data for each contamination level in the heat exchanger contamination reconstruction experiment as training data.

In the heat exchanger contamination reconstruction experiment, a device for suppressing flows of air around the heat exchanger, e.g., a windbreaker, may be installed to reconstruct contamination of the heat exchanger, in which case the measured operation data and a reconstructed contamination level may be used as the training data for the neural network 135.

In other words, in the heat exchanger contamination reconstruction experiment, a device for suppressing flows of air around at least one heat exchanger of the outdoor unit 110 or the indoor unit 120 may be installed, and the electronic device 130 may obtain operation data for each degree of suppressing flows of air from the outdoor unit 110 and the indoor unit 120 and use the operation data as the operation data that varies by contamination level.

With this, the neural network 135 may be trained with the operation data that varies by contamination level of a heat exchanger. The operation data used to train the neural network 135 may also include at least one of pressure of a heat exchanger, temperature of the heat exchanger, a frequency of a compressor, and a number of revolutions of the outdoor blower fan. As an additional example, the operation data may include at least one of pressure and refrigerant condensation temperature in a heat exchanger that functions as a condenser, pressure and refrigerant evaporation temperature in a heat exchanger that functions as an evaporator, a frequency of the compressor, and a number of revolutions of the outdoor blower fan.

The neural network 135 refers to machine learning that embodies a neural structure capable of performing deep learning, and as weight and bias corresponding to elements of the neural network 135 keep changing, learning confidence is improved. In other words, the neural network 135 may keep updating weights, biases, and activation functions included in the neural network 135 based on the operation data that varies by the reconstructed contamination level, thereby enhancing inference results of the neural network 135.

The training may be, for example, supervised learning having operation data as an input and a contamination data as an output.

The neural network 135 may include a CNN that generates a features map output by convolution of the operation data and inputs the features map to the neural network but it is not limited thereto and may be implemented with another deep learning algorithm including an RNN. That is, there is no limitation on the type of the neural network 135.

Figure 4:
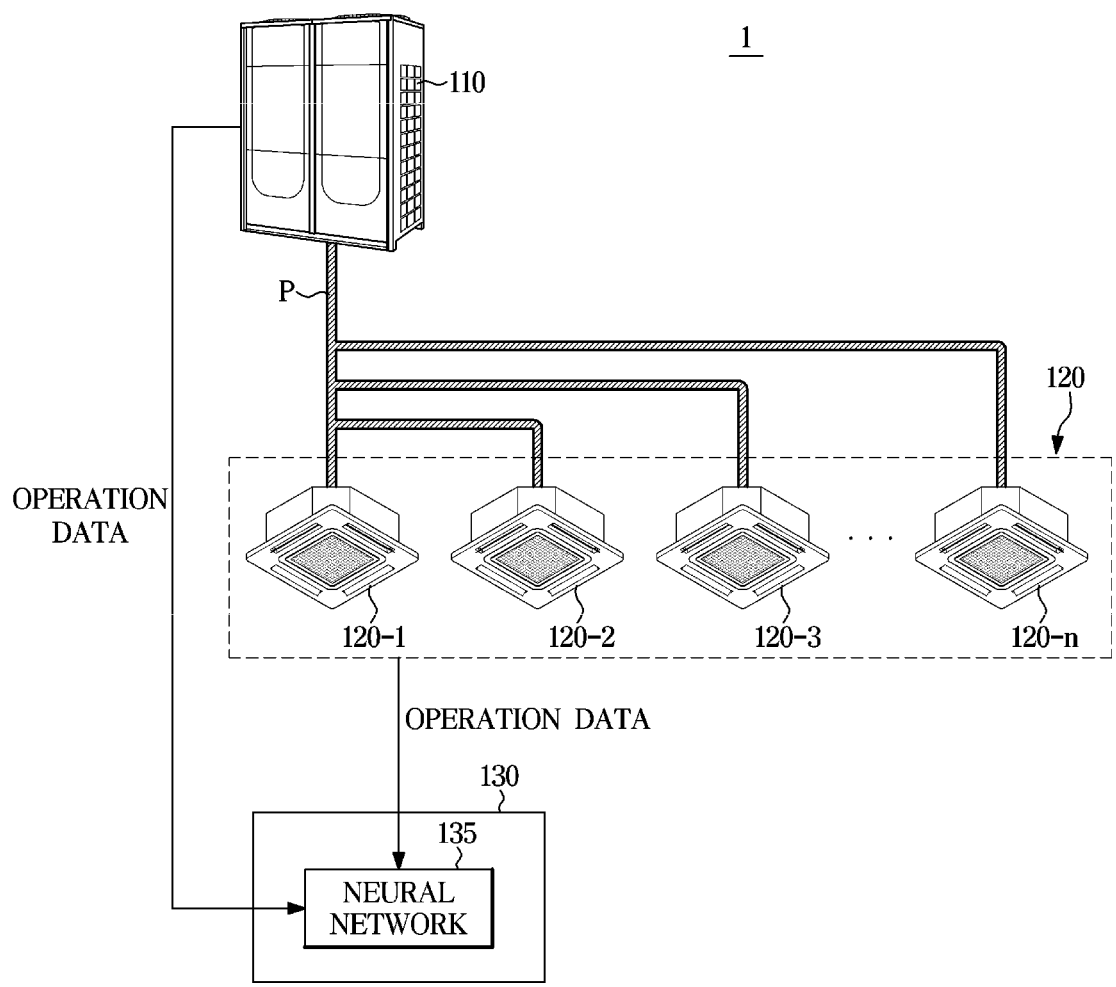
FIG. 4 is a diagram for describing an occasion when an electronic device determines a heat exchanger with degraded performance based on an output from a neural network for operation data, according to an embodiment of the disclosure.

FIG. 4 is a diagram for describing an occasion when the electronic device 130 determines a heat exchanger with degraded performance based on an output from the neural network 135 for operation data, according to an embodiment of the disclosure.

In general, when the heat exchanger collects dust and has a higher contamination level, the air flow rate is reduced, causing a reduction in cooling or heating efficiency and an increase in electricity rate. Hence, periodic cleaning of the heat exchanger is required, but the system air conditioner may have difficulty in determining which device (or unit) is to be cleaned because the system air conditioner has a lot of devices (units).

In the disclosure, the electronic device 130 may identify a device with degraded performance through the neural network 135 and notify a cleaning period of the device to the user.

Referring to FIG. 4, the electronic device 130 may determine a heat exchanger with a contamination level equal to or higher than a preset contamination level among the outdoor heat exchanger of the outdoor unit 110 and the indoor heat exchanger of the indoor unit 120 based on an output of the neural network 135 for operation data received from each of the outdoor unit 110 and the indoor unit 120 included in the air conditioning system 1.

In other words, the electronic device 130 may determine a cleaning period of a target device (unit) by determining a device having a heat exchanger with a contamination level equal to or higher than a preset contamination level as a device with degraded performance. For example, as shown in FIG. 4, the electronic device 130 may determine the contamination level of the outdoor heat exchanger equal to or higher than the preset contamination level as performance degradation of the outdoor unit 110, and determine a cleaning period of the outdoor heat exchanger in the outdoor unit 110

The preset contamination level may be set according to an input of the user. Contamination of a heat exchanger may mean that contaminants such as dust accumulate on the heat exchanger and a filter of the heat exchanger with use, leading to a reduction in efficiency of heat exchange and air flow rate.

The operation data may include at least one of pressure of the heat exchanger, temperature of the heat exchanger, a frequency of the compressor, and a number of revolutions of the outdoor blower fan. Specifically, the operation data may include at least one of pressure and refrigerant condensation temperature in a heat exchanger that functions as a condenser, pressure and refrigerant evaporation temperature in a heat exchanger that functions as an evaporator, a frequency of a compressor, and a number of revolutions of the outdoor blower fan.

Figure 5:
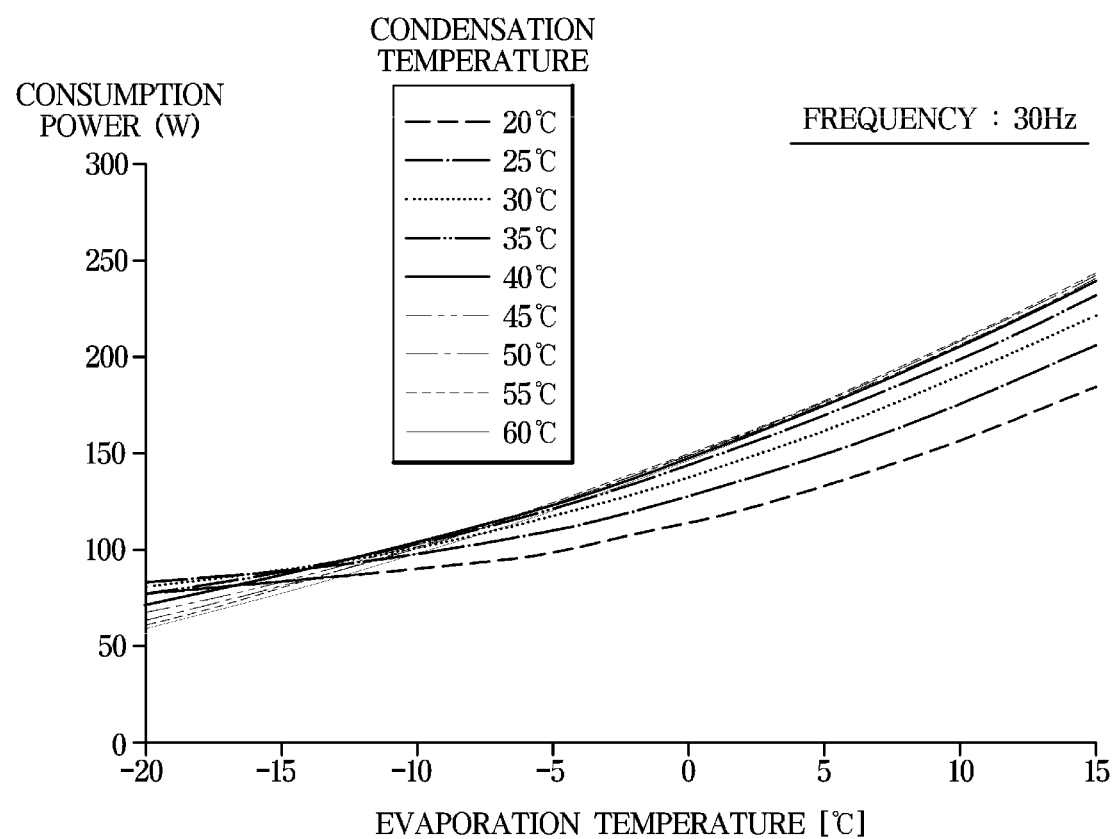
FIG. 5 illustrates compressor map data, according to an embodiment of the disclosure.
Figure 6:
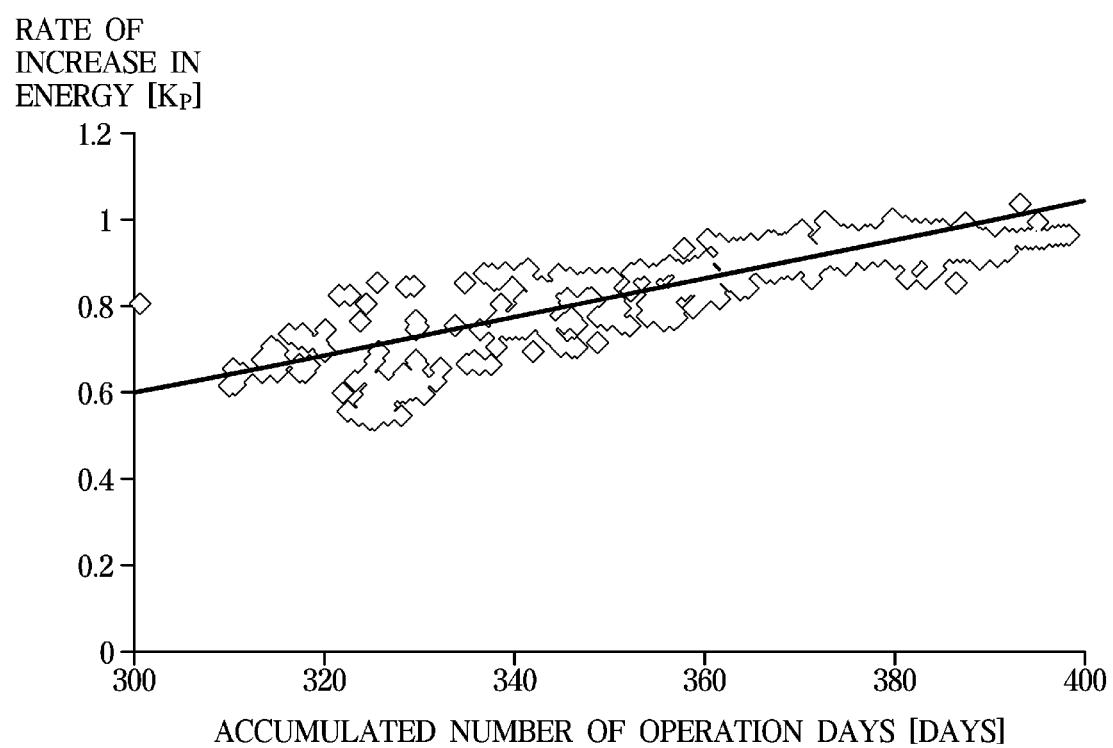
FIG. 6 illustrates an occasion when an electronic device determines a rate of increase in energy depending on the accumulated number of operation days, according to an embodiment of the disclosure.
Figure 7:
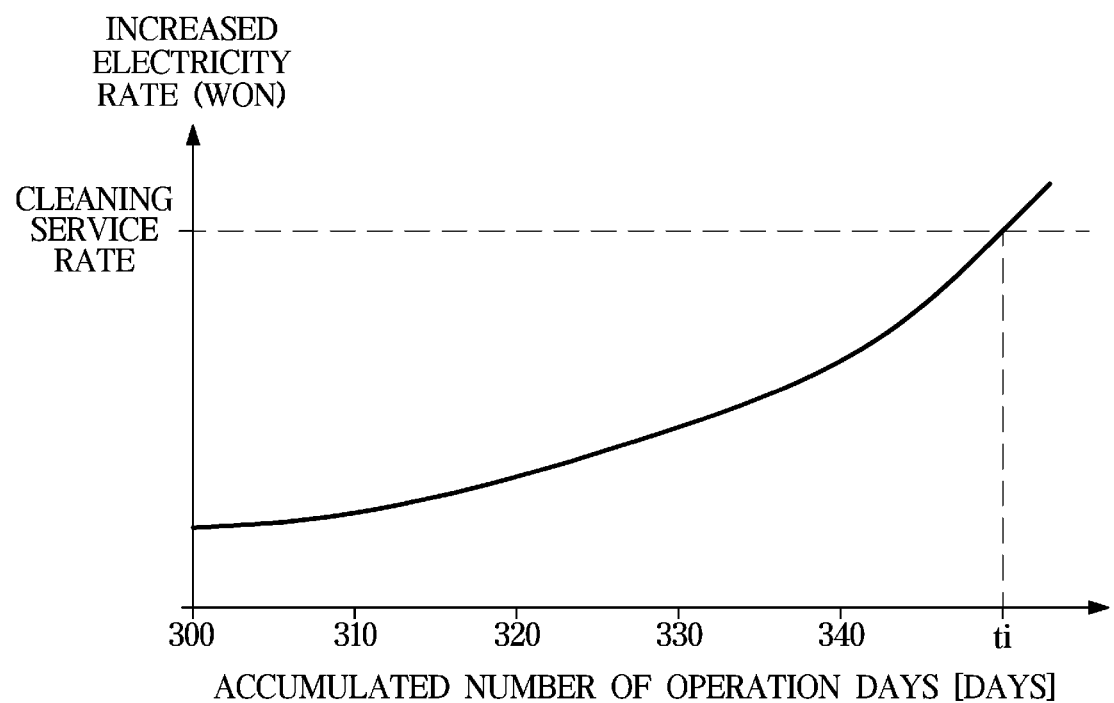
FIG. 7 is a diagram for describing an occasion when an electronic device determines a cleaning period of a heat exchanger, according to an embodiment of the disclosure.

FIG. 5 illustrates compressor map data, according to an embodiment of the disclosure, FIG. 6 illustrates an occasion when the electronic device 130 determines a rate of increase in energy depending on the accumulated number of operation days, according to an embodiment of the disclosure, FIG. 7 is a diagram for describing an occasion when the electronic device 130 determines a cleaning period of a heat exchanger, according to an embodiment of the disclosure, FIG. 8 illustrates an example in which the electronic device 130 displays information indicating cleaning periods of heat exchangers, according to an embodiment of the disclosure, and FIG. 9 illustrates an example in which the electronic device 130 displays information indicating cleaning periods of heat exchangers, according to an embodiment of the disclosure.

Referring to FIGS. 5 to 9, the electronic device 130 may determine a cleaning period of a heat exchanger determined to have a contamination level equal to or higher than the preset contamination level based on a rate of increase in energy of the heat exchange, and control the user interface 131 to output the cleaning period.

Specifically, the electronic device 130 may determine a rate of increase in energy $K_p$ of the heat exchanger determined to have a contamination level equal to or higher than the preset contamination level to be a ratio between power $P_{measured}$ measured by a watt-hour meter and reference power $P_{rated}$ calculated based on the compressor map data, as expressed in the following equation 1:

$$K_p = \frac{P_{measured}}{P_{rated}} \quad (1)$$

The watt-hour meter may be provided for each of the outdoor unit 110 and the indoor unit 120 for detecting power consumed by the corresponding unit. For this, the watt-hour meter may be provided as a known-type of watt-hour meter.

As shown in FIG. 5, the compressor map data may be experimental result data on power consumption of a compressor depending on a change in saturated evaporation temperature of a heat exchanger, saturated condensation temperature of the heat exchanger and frequency of the compressor in a design environment. The compressor map data may include data resulting from a simulation corresponding to each frequency of the compressor.

For example, the compressor map data may be obtained by using software (e.g., software in the loop simulation (SILS)) that performs a simulation with a virtual sensor in a design stage.

The software that performs the simulation may implement the virtual sensor by reconstructing memory operations or interrupt operations of an actual sensor in a personal computer (PC) and use the virtual sensor to measure the compressor power consumption depending on a change in the saturated evaporation temperature of a heat exchanger, the saturated condensation temperature of a heat exchanger and frequency of the compressor.

In an embodiment of the disclosure, the controller 133 may determine the reference power $P_{rated}$ depending on evaporation temperature of a heat exchanger, condensation temperature of the heat exchanger and a frequency of the compressor based on the compressor map data.

Specifically, the controller 133 may determine the reference power $P_{rated}$ depending on a refrigerant saturated evaporation temperature in a heat exchanger that functions as an evaporator and a refrigerant saturated condensation temperature in a heat exchanger that functions as a condenser through regression analysis using the compressor map data determined in a design stage.

For example, the reference power $P_{rated}$ may be determined by a regression analysis equation based on a condensation temperature $T_c$ and an evaporation temperature $T_e$ as expressed in the following equation 2:

$$P_{rated} = c_0 + c_1 \cdot T_c + c_2 \cdot T_e + c_3 \cdot T_c^2 + c_4 \cdot T_e^2 + c_5 \cdot T_c \cdot T_e \quad (2)$$

Specifically, the controller 133 may build up a virtual sensor that expects consumption power, i.e., reference power $P_{rated}$, based on a saturated evaporation temperature and a saturated condensation temperature of a heat exchanger and a compressor frequency by using the compressor map data determined in a design environment, and calculate the reference power $P_{rated}$ by inputting the saturated evaporation temperature and the saturated condensation temperature of the heat exchanger and compressor frequency data of the air conditioning system 1 being used in an actual building to the virtual sensor.

In an embodiment of the disclosure, through regression analysis on the rate of increase in energy $K_p$ determined to be a ratio between the power $P_{measured}$ measured by a watt-hour meter and the reference power $P_{rated}$ calculated based on the compressor map data, the electronic device 130 may determine a rate of increase in energy $K_p$ depending on the accumulated number of operation days $t_c$ as in the following equation 3 and shown in FIG. 6.

$$K_p = a \cdot t_c + b \quad (3)$$

In other words, the electronic device 130 may determine a rate of increase in energy $K_p$ having a particular value during a preset period, and determine a rate of increase in energy $K_p$ over time $t_c$ through regression analysis on rates of increase in energy $K_p$ determined in the preset period.

In an embodiment of the disclosure, the electronic device 130 may determine an increased electricity rate depending on the accumulated number of operation days $t_c$ based on a rate of increase in energy $K_p$ depending on the accumulated number of operation days $t_c$ and an electricity rate per day.

In other words, the electronic device 130 may determine an increased electricity rate per day by multiplying the rate of increase in energy $K_p$ per day and the electricity rate per day, and determine an increased electricity rate depending on the accumulated number of operation days $t_c$ by adding the increased electricity rate per day.

In this case, the electronic device 130 may calculate an electricity rate per day based on the past rate data, and separately calculate the electricity rate per day in the cooling mode and the electricity rate per day in the heating mode.

In an embodiment of the disclosure, the electronic 130 may determine a cleaning period by comparing the increased electricity rate depending on the accumulated number of operation days $t_c$ with a preset cleaning service rate, as shown in FIG. 7.

Specifically, the electronic device 130 may determine a difference between a date at which the increased electricity rate depending on the accumulated number of operation days $t_c$ exceeds the preset cleaning service rate and a previous cleaning date as the cleaning period.

In an embodiment of the disclosure, the electronic device 130 may control the user interface 131 to output the determined cleaning period.

For example, the electronic device 130 may display information indicating a cleaning period for each of at least one unit (an outdoor unit, a first indoor unit, and a second indoor unit detected to have degraded performance among the units included in the air conditioning system 1, and notify that the unit determined to be in need of cleaning according to the cleaning period needs to be cleaned.

Furthermore, the electronic device 130 may display information indicating a cleaning period for each of at least one outdoor unit (a first outdoor unit, a second outdoor unit, and a third outdoor unit) detected to have degraded performance among the plurality of outdoor units included in the air conditioning system 1, and notify that the unit determined to be in need of cleaning according to the cleaning period needs to be cleaned.

An embodiment of a method of controlling the electronic device 130 will now be described from a perspective. As for the method of controlling the electronic device 130, the electronic device 130 in the aforementioned embodiments may be used. Hence, what are described above with reference to FIGS. 1 to 9 may be equally applied in the following method of controlling the electronic device 130.

Figure 10:
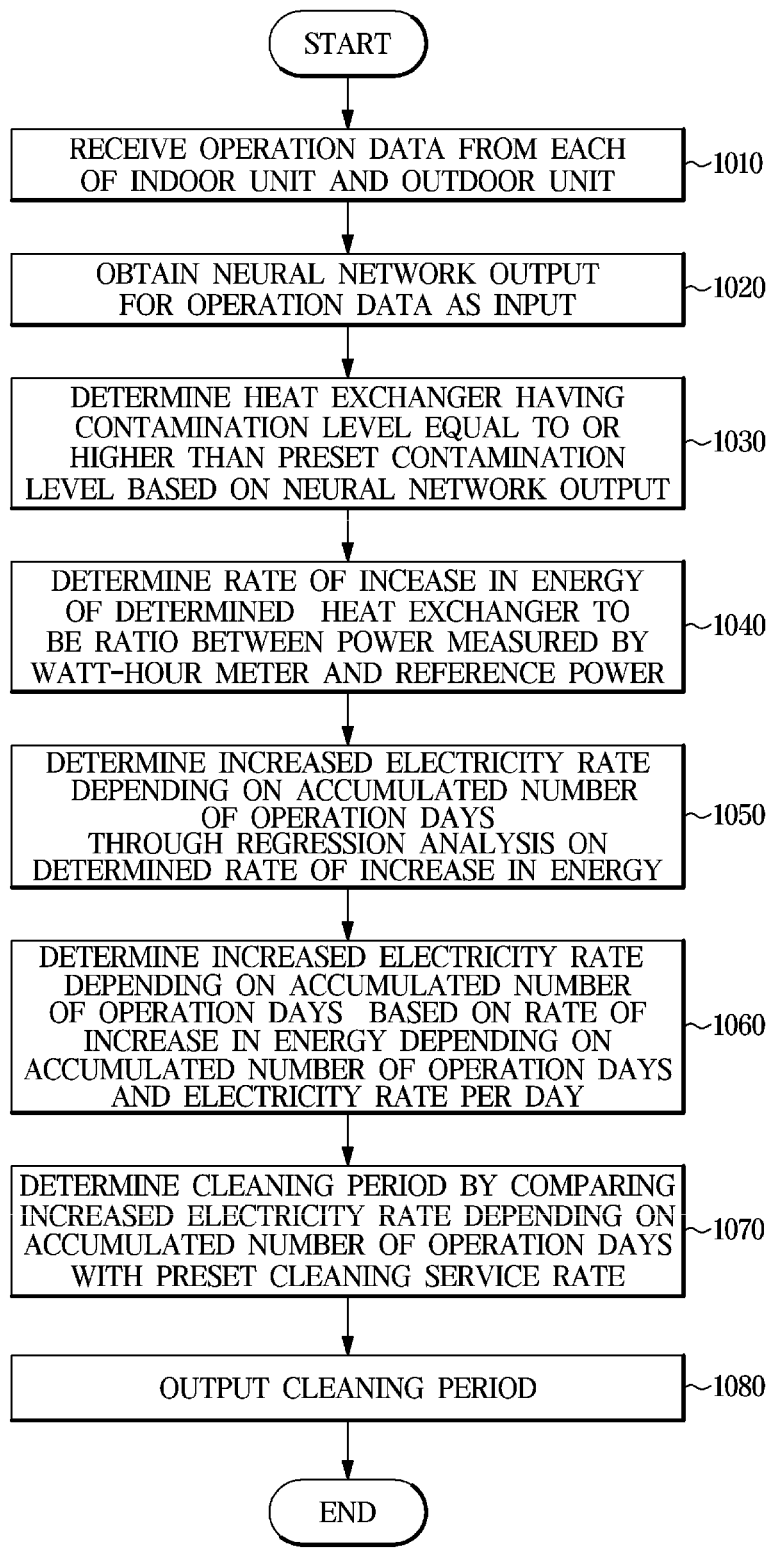
FIG. 10 is a flowchart of notifying a cleaning period in a method of controlling an electronic device, according to an embodiment of the disclosure.

FIG. 10 is a flowchart of notifying a cleaning period in a method of controlling the electronic device 130, according to an embodiment of the disclosure.

Referring to FIG. 10, the electronic device 130 may receive operation data from each of the indoor unit 120 and the outdoor unit 110, in 1010.

That is, the electronic device 130 may receive operation data from each of the outdoor unit 110 and the indoor unit 120 included in the air conditioning system 1 through the communication module 132.

Specifically, the electronic device 130 may receive operation data from each of the at least one outdoor unit 100 and the plurality of indoor units 120 connected to the at least one outdoor unit 110.

The electronic device 130 may obtain an output of the neural network 135 for the operation data as input data.

In this case, the operation data may include at least one of pressure of a heat exchanger, temperature of the heat exchanger, a frequency of a compressor, and a number of revolutions of the outdoor blower fan. Specifically, the operation data may include at least one of pressure and refrigerant condensation temperature in a heat exchanger that functions as a condenser, pressure and refrigerant evaporation temperature in a heat exchanger that functions as an evaporator, a frequency of the compressor, and a number of revolutions of the outdoor blower fan.

Furthermore, the neural network 135 may be trained with the operation data that varies by contamination level of a heat exchanger. Specifically, the electronic device 130 may train the neural network with operation data for each contamination level in a heat exchanger contamination reconstruction experiment as training data. In the heat exchanger contamination reconstruction experiment, a device for suppressing flows of air around the heat exchanger, e.g., a windbreaker, may be installed to reconstruct contamination of the heat exchanger, in which case the measured operation data and a reconstructed contamination level may be used as the training data for the neural network 135.

In an embodiment of the disclosure, the electronic device 130 may determine a heat exchanger with a contamination level equal to or higher than a preset contamination level based on the output of the neural network 135, in 1030.

specifically, the electronic device 130 may determine a heat exchanger with a contamination level equal to or higher than a preset contamination level among the outdoor heat exchanger of the outdoor unit 110 and the indoor heat exchanger of the indoor unit 120 based on an output of the neural network 135 for the operation data received from each of the outdoor unit 110 and the indoor unit 120 included in the air conditioning system 1.

The preset contamination level may be set according to an input of the user. Contamination of a heat exchanger may mean that contaminants such as dust accumulate on the heat exchanger and a filter of the heat exchanger with use, leading to a reduction in efficiency of heat exchange and air flow rate.

In an embodiment of the disclosure, as for the heat exchanger determined to have a contamination level equal to or higher than the preset contamination level, the electronic device 130 may determine a rate of increase in energy $K_p$ of the heat exchanger determined to have a contamination level equal to or higher than the preset contamination level to be a ratio between power $P_{measured}$ measured by a watt-hour meter and reference power $P_{rated}$ calculated based on the compressor map data, in 1040.

Furthermore, the electronic device 130 may determine a rate of increase in energy $K_p$ depending on the accumulated number of operation days $t_c$ through regression analysis on the determined rate of increase in energy $K_p$, in 1050.

In other words, the electronic device 130 may determine a rate of increase in energy $K_p$ having a particular value during a preset period, and determine a rate of increase in energy $K_p$ over time tc through regression analysis on rates of increase in energy $K_p$ determined in the preset period.

In an embodiment of the disclosure, the electronic device 130 may determine an increased electricity rate depending on the accumulated number of operation days $t_c$ based on a rate of increase in energy $K_p$ depending on the accumulated number of operation days $t_c$ and an electricity rate per day, in 1060.

In other words, the electronic device 130 may determine an increased electricity rate per day by multiplying the rate of increase in energy $K_p$ per day and the electricity rate per day, and determine an increased electricity rate depending on the accumulated number of operation days $t_c$ by adding the increased electricity rate per day.

In this case, the electronic device 130 may calculate an electricity rate per day based on the past rate data, and separately calculate the electricity rate per day in the cooling mode and the electricity rate per day in the heating mode.

The electronic device 130 may determine a cleaning period by comparing the increased electricity rate depending on the accumulated number of operation days $t_c$ with a preset cleaning service rate in 1070, and output the determined cleaning period in 180.

Specifically, the electronic device 130 may determine a difference between a date at which the increased electricity rate depending on the accumulated number of operation days $t_c$ exceeds the preset cleaning service rate and a previous cleaning date as the cleaning period.

Meanwhile, the embodiments of the disclosure may be implemented in the form of a recording medium for storing instructions to be carried out by a computer. The instructions may be stored in the form of program codes, and when executed by a processor, may generate program modules to perform operation in the embodiments of the disclosure. The recording media may correspond to computer-readable recording media.

The computer-readable recording medium includes any type of recording medium having data stored thereon that may be thereafter read by a computer. For example, it may be a read only memory (ROM), a random access memory (RAM), a magnetic tape, a magnetic disk, a flash memory, an optical data storage device, etc.

According to an embodiment of the disclosure, an electronic device in an air conditioning system may identify a target device (unit) with performance degradation due to contamination of a heat exchanger in the air conditioning system and determine and notify a cleaning period of the heat exchanger of the target device to the user.

The embodiments of the disclosure have thus far been described with reference to accompanying drawings. It will be obvious to those of ordinary skill in the art that the disclosure may be practiced in other forms than the embodiments as described above without changing the technical idea or essential features of the disclosure. The above embodiments of the disclosure are only by way of example, and should not be construed in a limited sense.

What is claimed is:

1. An electronic device comprising:
a user interface;
a communication module configured to perform communication with at least one outdoor unit and a plurality of indoor units connected to the at least one outdoor unit; and
at least one processor configured to:
receive, through the communication module, operation data of the at least one outdoor unit and the plurality of indoor units, wherein
the operation data of the at least one outdoor unit includes at least one of pressure of a heat exchanger of the at least one outdoor unit, temperature of a heat exchanger of the at least one outdoor unit, frequency of a compressor of the at least one outdoor unit, and a number of revolutions of a blower fan of the at least one outdoor unit, and
the operation data of the plurality of indoor units includes at least one of pressure of a heat exchanger of at least one of the plurality of indoor units, and temperature of a heat exchanger of at least one of the plurality of indoor units,
determine a heat exchanger with a contamination level equal to or higher than a preset contamination level among a heat exchanger of the at least one outdoor unit and heat exchangers of the plurality of indoor units based on the received operation data,
determine, based on power consumption of the determined heat exchanger measured by a meter, a rate of increase in energy of the determined heat exchanger,
determine, based on the determined rate of increase in energy, a cleaning period of the determined heat exchanger, and
control the user interface to output information indicating the determined cleaning period.

2. The electronic device of claim 1, wherein the at least one processor is configured to:
store compressor map data,
calculate a reference power consumption based on the compressor map data, and
determine the rate of increase in energy to be a ratio between the measured power consumption and the reference power consumption.

3. The electronic device of claim 2, wherein the compressor map data is experimental result data on power consumption of a compressor based on at least one of a change in saturated evaporation temperature of a heat exchanger, saturated condensation temperature of a heat exchanger, and compressor frequency.

4. The electronic device of claim 3, wherein the at least one processor is configured to:
calculate a reference power consumption based on at least one of the saturated evaporation temperature, the saturated condensation temperature, and the compressor frequency.

5. The electronic device of claim 1, wherein the at least one processor is configured to:
determine the rate of increase in energy based on an accumulated number of operation days.

6. The electronic device of claim 5, wherein the at least one processor is configured to:
determine an increased electricity rate based on an electricity rate per day and the determined rate of increase in energy.

7. The electronic device of claim 6, wherein the at least one processor is configured to:
 determine the cleaning period based on comparing the increased electricity rate with a preset cleaning service rate.

8. The electronic device of claim 7, wherein the at least one processor is configured to:
 determine, based on a difference between a date at which the increased electricity rate exceeds the preset cleaning service rate and a previous cleaning date as the cleaning period.

9. The electronic device of claim 1 further comprising:
 memory storing a model trained with, as input data, operation data of indoor units that varies by contamination levels of heat exchangers included in the indoor units and operation data of outdoor units that varies by contamination levels of heat exchangers included in the outdoor units,
 wherein the at least one processor is configured to provide the received operation data as input data to the model and use resulting output of the model to determine the heat exchanger with the contamination level equal to or higher than a preset contamination level among a heat exchanger of the at least one outdoor unit and heat exchangers of the plurality of indoor units.

* * * * *